United States Patent
Yoo et al.

(10) Patent No.: US 11,584,674 B2
(45) Date of Patent: Feb. 21, 2023

(54) CURVED GLASS MANUFACTURING METHOD

(71) Applicant: LG Electronics Inc., Seoul (KR)

(72) Inventors: Hanjong Yoo, Seoul (KR); Jinsoo Lee, Seoul (KR); Donghwan Jeong, Seoul (KR); Subin Ha, Seoul (KR); Minkyu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 16/608,085

(22) PCT Filed: Sep. 6, 2017

(86) PCT No.: PCT/KR2017/009778
§ 371 (c)(1),
(2) Date: Oct. 24, 2019

(87) PCT Pub. No.: WO2018/199402
PCT Pub. Date: Nov. 1, 2018

(65) Prior Publication Data
US 2021/0101819 A1    Apr. 8, 2021

Related U.S. Application Data

(60) Provisional application No. 62/488,867, filed on Apr. 24, 2017.

(51) Int. Cl.
*C03B 23/03* (2006.01)
*C03B 35/20* (2006.01)
(Continued)

(52) U.S. Cl.
CPC ........ *C03B 23/023* (2013.01); *C03B 23/0305* (2013.01); *C03B 29/025* (2013.01);
(Continued)

(58) Field of Classification Search
CPC ........ C03B 23/03–0307; C03B 35/142; C03B 35/202
See application file for complete search history.

(56) References Cited

U.S. PATENT DOCUMENTS 2,795,084 A * 6/1957 Littleton ............. C03B 23/0307
65/23
3,208,839 A * 9/1965 Nordberg ............. C03B 29/025
65/106
(Continued)

FOREIGN PATENT DOCUMENTS

| CN | 106430924 | 2/2017 |
| CN | 206089439 | 4/2017 |

(Continued)

OTHER PUBLICATIONS

KR 101244033 B1 (Liaw) Mar. 18, 2013 (English language machine translation), [online] [retrieved Feb. 22, 2022], Retrieved from: Espacenet. (Year: 2013).*

(Continued)

*Primary Examiner* — Erin Snelting
(74) *Attorney, Agent, or Firm* — Fish & Richardson P.C.

(57) ABSTRACT

A curved glass manufacturing method includes: successively stacking a lower mold, flat glass, and an upper mold, thereby forming a mold assembly; moving the mold assembly to a first chamber and then heating the same; moving the mold assembly from the first chamber to a second chamber and then pressurizing the upper mold so as to move the upper mold downward, thereby molding the flat glass in a curved shape; moving the mold assembly from the second chamber to a third chamber and then slowly cooling the molded glass; and moving the mold assembly from the third chamber to a fourth chamber and then cooling the molded glass. An elastic member is arranged between the lower mold and the upper mold and configured to define a space (Continued)

between the upper mold and the flat glass, and the elastic member is compressed when the upper mold is pressurized.

19 Claims, 9 Drawing Sheets

(51) Int. Cl.
*C03B 23/023* (2006.01)
*C03C 17/00* (2006.01)
*C03C 17/30* (2006.01)
*C03C 21/00* (2006.01)
*C03B 29/02* (2006.01)

(52) U.S. Cl.
CPC .......... *C03B 35/202* (2013.01); *C03C 17/007* (2013.01); *C03C 17/009* (2013.01); *C03C 17/30* (2013.01); *C03C 21/002* (2013.01); *C03B 2215/07* (2013.01); *C03B 2215/22* (2013.01)

(56) References Cited

U.S. PATENT DOCUMENTS

| | | | | |
|---|---|---|---|---|
| 4,778,507 | A * | 10/1988 | Aruga | C03B 23/0305 65/273 |
| 4,828,598 | A * | 5/1989 | Imamura | C03B 23/0305 65/106 |
| 5,053,069 | A * | 10/1991 | Vanaschen | C03B 23/03 65/288 |
| 5,183,491 | A * | 2/1993 | D'Iribarne | C03B 27/0442 65/374.13 |
| 5,328,496 | A * | 7/1994 | Lesage | C03B 23/023 65/288 |
| 5,441,551 | A * | 8/1995 | Ollfisch | C03B 23/0307 65/374.13 |
| 6,067,819 | A * | 5/2000 | Tanaka | C03B 23/0307 65/273 |
| 2003/0106341 | A1* | 6/2003 | Hanada | C03B 25/08 65/106 |
| 2004/0226318 | A1 | 11/2004 | Schwartz et al. | |
| 2006/0099407 | A1 | 5/2006 | Wang et al. | |
| 2012/0164415 | A1 | 6/2012 | Otani et al. | |
| 2013/0196140 | A1 | 8/2013 | Lewis et al. | |
| 2014/0075996 | A1* | 3/2014 | Dannoux | C03B 23/0307 65/273 |
| 2014/0333850 | A1 | 11/2014 | Kim et al. | |
| 2014/0373573 | A1 | 12/2014 | Hwang et al. | |
| 2015/0274572 | A1* | 10/2015 | Wada | C03B 40/005 65/273 |
| 2015/0368140 | A1* | 12/2015 | Ikemoto | C03B 23/0307 65/106 |
| 2016/0145139 | A1* | 5/2016 | Fredholm | C03B 25/08 65/271 |
| 2016/0145141 | A1* | 5/2016 | Bennett | C03B 35/207 65/103 |
| 2017/0021383 | A1 | 1/2017 | Takai et al. | |
| 2017/0022086 | A1* | 1/2017 | Kim | C03B 23/03 |
| 2017/0107144 | A1 | 4/2017 | Horie et al. | |
| 2017/0291843 | A1* | 10/2017 | Brocheton | C03B 23/025 |

FOREIGN PATENT DOCUMENTS

| | | |
|---|---|---|
| EP | 2752387 | 7/2014 |
| GB | 1299384 | 12/1972 |
| JP | H09202626 | 8/1997 |
| KR | 20030043625 | 6/2003 |
| KR | 1020120098668 | 9/2012 |
| KR | 1020120138195 | 12/2012 |
| KR | 101244033 | 3/2013 |
| KR | 1020130034693 | 4/2013 |
| KR | 1020140026535 | 3/2014 |
| KR | 1020140058962 | 5/2014 |
| KR | 20150000611 | 1/2015 |
| WO | WO0107373 | 2/2001 |
| WO | WO2015041257 | 3/2015 |
| WO | WO2015186753 | 12/2015 |
| WO | WO2016146895 | 9/2016 |

OTHER PUBLICATIONS

Extended European Search Report in European Appln. No. 17906909. 1, dated Dec. 22, 2020, 7 pages.
Extended European Search Report in European Appln. No. 18791491. 6, dated Dec. 23, 2020, 8 pages.
KR Office Action in Korean Appln. No. 10-2017-0121969, dated May 29, 2019, 9 pages (with English translation).
KR Office Action in Korean Appln. No. 10-2017-0121969, dated Nov. 19, 2018, 11 pages (with English translation).
PCT International Search Report and Written Opinion in International Appln. No. PCT/KR2018/000789, dated May 28, 2018, 25 pages (with English translation).
U.S. Appl. No. 16/608,070, filed Oct. 24, 2019, Byungchung Moon.
United States Office Action in U.S. Appl. No. 16/608,070, dated Oct. 9, 2020, 13 pages.
Office Action in U.S. Appl. No. 16/608,070, dated May 14, 2021, 16 pages.

\* cited by examiner

CURVED GLASS MANUFACTURING METHOD

CROSS-REFERENCE TO RELATED APPLICATIONS

This application is the National Stage filing under 35 U.S.C. 371 of International Application No. PCT/KR2017/009778, filed on Sep. 6, 2017, which claims the benefit of earlier filing date and right of priority to U.S. Provisional Application No. 62/488,867 filed on Apr. 24, 2017, the contents of which are all hereby incorporated by reference herein in their entirety.

TECHNICAL FIELD

The present disclosure relates to a method for manufacturing curved glass.

BACKGROUND

A display may include cover glass for protecting the display. The cover glass may be highly light-transmissive and non-fragile. With development of display technologies, a curved display has begun to be developed, and accordingly, a demand for cover glass in a curved shape is increasing.

Various glass molding methods may be utilized to produce curved cover glass. In some examples, where the dimension of the cover glass applied to the curved display has an error range of several hundred micrometers, very high precision is needed for production. In some cases, a press molding method having high molding precision may be utilized.

In some examples, the curved display may be applied to the front and rear surfaces of a vehicle. In some cases, where the press molding method is used with high precision for processing large glass, it may be difficult to mold the glass within an error range of several hundred micrometers. Therefore, a demand for a more precise glass molding method is increasing.

SUMMARY

One aspect of the present disclosure is to provide a manufacturing method of increasing precision for molding glass into a curved shape and simultaneously reducing a glass molding time.

Detailed aspects of the present disclosure are as follows.

The present disclosure describes preventing flat glass from being damaged due to the weight of an upper mold when performing a molding (or forming) process after primarily aligning a lower mold, the flat glass, and the upper mold.

The present disclosure also describes preventing reduction of molding precision, which is caused by a mold damaged due to repetitive use.

The present disclosure also describes minimizing a supply rate and a supply amount of nitrogen gas for preventing oxidization of a mold during a molding process.

According to one aspect of the subject matter described in this application, a method for manufacturing curved glass includes: preparing a mold assembly by stacking a lower mold, a glass part that has a flat shape, and an upper mold, where the mold assembly includes an elastic member that is disposed between the lower mold and the upper mold and that defines a space between the upper mold and the glass part; placing the mold assembly in a first chamber, and heating the mold assembly in the first chamber; moving the mold assembly from the first chamber to a second chamber, and pressurizing the upper mold and the elastic member downward to the lower mold in the second chamber to mold the glass part into a curved shape; moving the mold assembly from the second chamber to a third chamber, and cooling the glass part in the third chamber; and moving the mold assembly from the third chamber to a fourth chamber, and cooling the glass part in the fourth chamber.

Implementations according to this aspect may include one or more of the following features. For example, heating the mold assembly in the first chamber may be performed based on the first chamber having an internal temperature in a range from room temperature to 900° C., and pressurizing the upper mold to the lower mold in the second chamber may be performed based on the second chamber having an internal temperature in a range from 700 to 900° C. Cooling the glass part in the third chamber may be performed based on the third chamber having an internal temperature in a range from 700 to 400° C., and cooling the glass part in the fourth chamber may be performed based on the fourth chamber having an internal temperature in a range from room temperature to 400° C.

In some examples, a plastic limit temperature of the elastic member may be greater than or equal to 900° C. in a state in which the elastic member is compressed by the upper mold. In some examples, the elastic member may be an alloy including Ni, Cr, Ti, and Al.

In some implementations, pressurizing the upper mold and the elastic member downward may include fixing the upper mold to the lower mold, and moving the mold assembly from the second chamber to the third chamber and cooling the glass part in the third chamber may be performed in a state in which the upper mold is fixed to the lower mold.

In some implementations, placing the mold assembly in the first chamber may be performed based on the first chamber having a nitrogen atmosphere, moving the mold assembly from the first chamber to the second chamber may be performed based on the second chamber having a nitrogen atmosphere, and moving the mold assembly from the second chamber to the third chamber may be performed based on the third chamber having a nitrogen atmosphere.

In some examples, placing the mold assembly to the first chamber may include: placing the mold assembly to a first sub chamber and then supplying nitrogen to an inside of the first sub chamber to define a nitrogen atmosphere; moving the mold assembly from the first sub chamber to a second sub chamber that has a nitrogen atmosphere; and moving the mold assembly from the second sub chamber to the first chamber, where a volume of the first sub chamber is less than a volume of the second sub chamber. In some examples, a nitrogen pressure inside the first sub chamber may be greater than a nitrogen pressure in the second sub chamber.

In some examples, moving the mold assembly from the third chamber to the fourth chamber and cooling the glass part in the fourth chamber may include: moving the mold assembly from the third chamber to a third sub chamber that has a nitrogen atmosphere; moving the mold assembly from the third sub chamber to a fourth sub chamber that has a nitrogen atmosphere; and moving the mold assembly from the fourth sub chamber to the fourth chamber that has an air atmosphere, where a volume of the fourth sub chamber is less than a volume of the third sub chamber.

In some implementations, each of moving the mold assembly may include: moving a transferring bar disposed vertically below one chamber into the one chamber, and lifting the mold assembly from below the mold assembly by the transferring bar; horizontally moving the mold assembly from the one chamber to another chamber based on the transferring bar lifting the mold assembly; and putting the mold assembly down on a bottom surface of the other chamber based on moving the transferring bar to a lower side of the other chamber.

In some examples, each of the first chamber, the second chamber, the third chamber, and the fourth chamber defines a passage that passes through a bottom surface thereof and that allows movement of the transferring bar, where horizontally moving the mold assembly may include moving the transferring bar horizontally along the passage. In some examples, adjacent chambers among the first chamber, the second chamber, the third chamber, and the fourth chamber are divided by a partition wall interposed therebetween and configured to be opened and closed, where horizontally moving the mold assembly may include opening the partition wall based on moving the transferring bar horizontally along the passage. In some implementations, the partition wall may define a partition hole that allows the transferring bar to horizontally move between the adjacent chambers.

In some implementations, each of the first chamber, the second chamber, and the third chamber may include a first hot plate that includes a heating portion configured to contact each of an upper side of the upper mold and a lower side of the lower mold and to change a temperature of the mold assembly based on electric current; and a heat transfer layer that covers the heating portion, where heating the mold assembly in the first chamber may include bringing the first hot plate located in the first chamber into contact with each of the upper side of the upper mold and the lower side of the lower mold.

In some examples, a ratio of a thickness of the heat transfer layer with respect to a width of the first hot plate is in a range from 0.01 to 0.1. In some examples, the heat transfer layer may be made of graphite, anti-oxidation coated graphite, or a ceramic material.

In some implementations, each of the first chamber, the second chamber, and the third chamber may include a second hot plate that is disposed on a side surface thereof and that has a temperature higher than a temperature of the first hot plate. In some examples, heating the mold assembly in the first chamber further may include bringing the first hot plate into contact with the mold assembly while maintaining a space between the second hot plate and the mold assembly.

In some implementations, pressurizing the upper mold in the second chamber may include heating and applying pressure to the mold assembly based on bringing the first hot plate located in the second chamber into contact with each of the upper side of the upper mold and the lower side of the lower mold.

In some implementations, the method may further include vertically moving the mold assembly within at least one of the first chamber, the second chamber, or the third chamber.

In some implementations, where a lower mold, flat glass, and an upper mold are sequentially aligned, the flat glass can be prevented from being damaged due to a weight of the upper mold. Accordingly, the molds and the glass can primarily be aligned before a glass molding process, thereby improving molding precision.

In some implementations, since an impact applied to a mold during a molding process can be minimized, the mold may be prevented from being damaged during the molding process.

In some implementations, a supply time and a supply amount of nitrogen gas for preventing oxidization of a mold during a molding process can be reduced, thereby shortening a glass molding time and reducing a molding cost.

DETAILED DESCRIPTION

Figure 1:
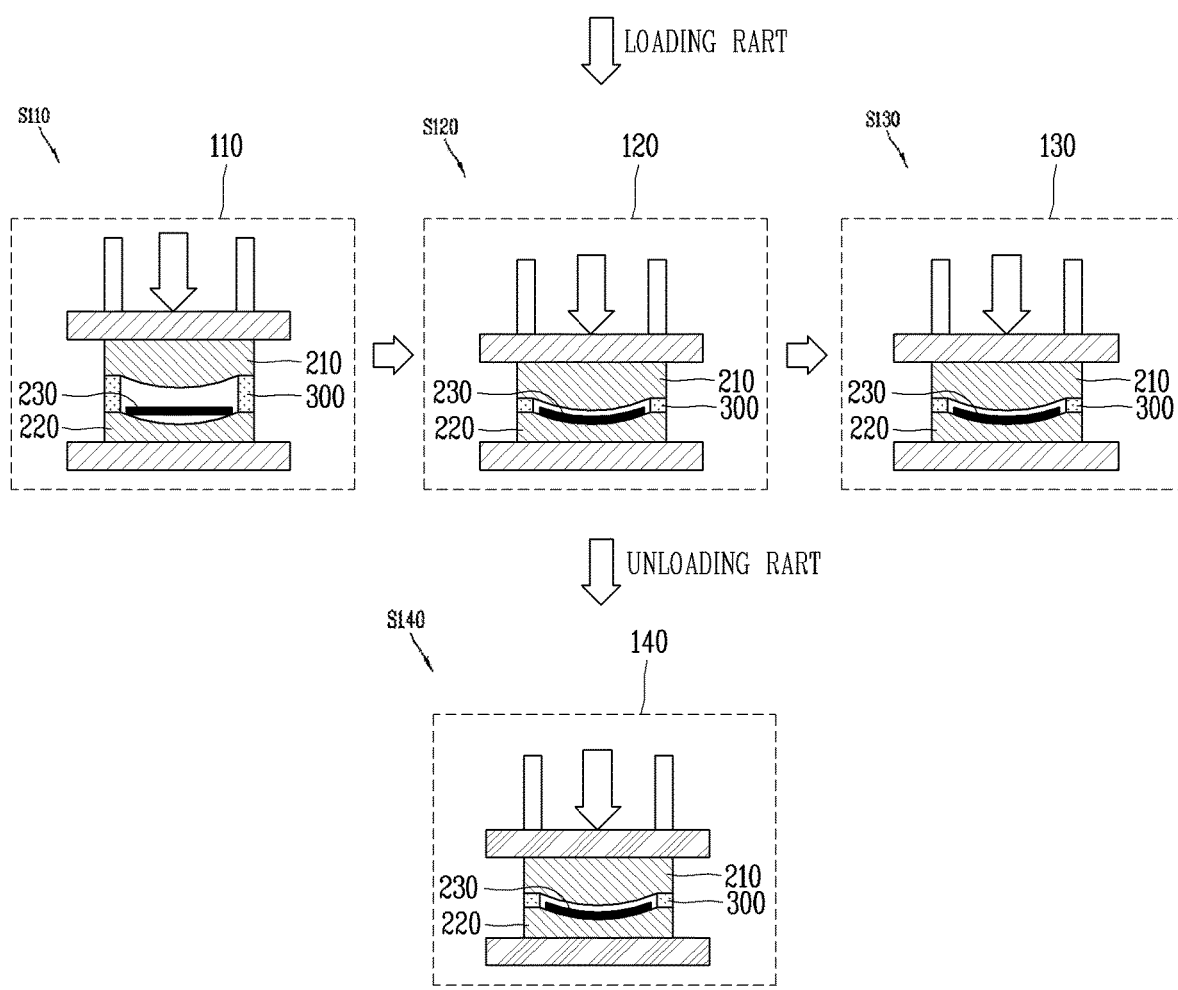
FIG. 1 is a conceptual view illustrating an example of a glass manufacturing method.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Prior to describing a method for producing curved glass according to the present disclosure, press molding according to related art will be described.

In a related art press molding method, flat glass is placed on a lower mold and then heated. Thereafter, the flat glass is pressurized by a heated upper mold.

In the case of molding the glass by the method, it is difficult to process the glass within an error range of several hundred micrometers when an area of the glass to be formed is increased.

Molding precision may be improved by utilizing a scheme of pressurizing an upper mold after primarily aligning the lower mold, the flat glass, and the upper mold. However, when this method is applied to form large glass, there is a problem that the glass is likely to be broken due to the weight of the upper mold. Specifically, when the area of the glass to be processed is increased, the size of the molds is necessarily increased. This causes the increase in weight of the glass. Glass utilized for cover glass has a thickness of about 2 to 3 mm, and the glass with this thickness may be broken without bearing the increased weight of the upper mold. The present disclosure provides a manufacturing method capable of preventing glass from being broken when primarily aligning a lower mold, a flat glass and an upper mold.

In some cases, when a large impact is applied to a mold during the press molding, the mold may be damaged. Accordingly, when the mold is reused, molding precision may be lowered. In addition, an impact applied to a mold during a molding process may be delivered even to glass and the glass may be broken. The present disclosure provides a manufacturing method capable of minimizing an impact applied to a mold during a molding process.

In some cases, the press molding method is carried out at a high temperature of several hundred degrees (° C.), and the mold may be oxidized at this temperature. If the mold is oxidized, a surface and the like may be damaged and precision of glass processing may be degraded. To prevent this, a space in which the molding process takes place is filled with nitrogen gas. External air may be introduced into the space when supplying new glass or whenever processed glass is discharged. Therefore, the nitrogen gas should be periodically supplied into the space. This causes a problem that a processing time and a process cost increase. The present disclosure minimizes a nitrogen supply time and minimizes an amount of nitrogen used by way of minimizing the size of the space filled with the nitrogen.

Hereinafter, the manufacturing method for achieving the above-mentioned aspects will be described.

Figure 2A:
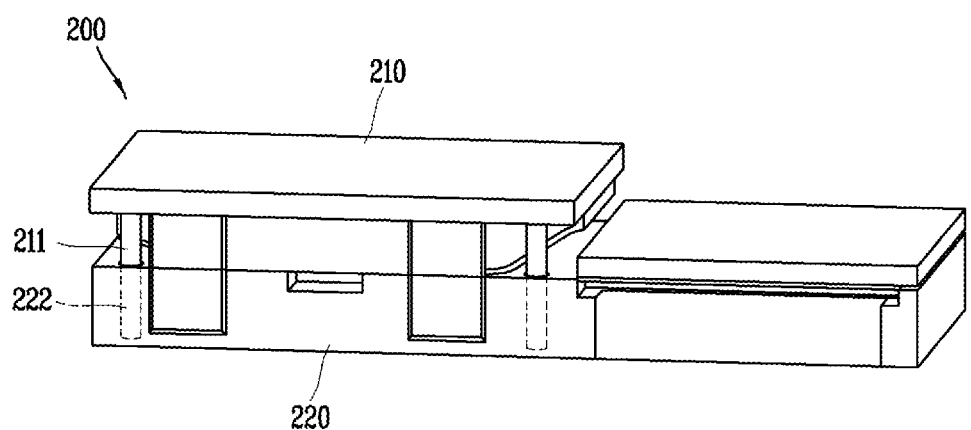
FIG. 2A is a perspective view showing an example mold.
Figure 2B:
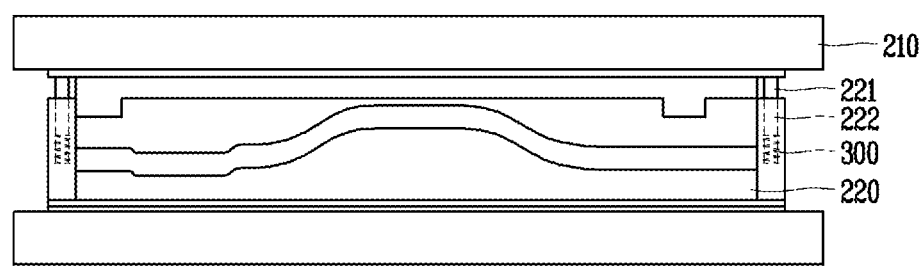
FIG. 2B is a cross-sectional view showing the mold of FIG. 2A.

FIG. 1 is a conceptual view illustrating an example a glass manufacturing method, FIG. 2A is a perspective view of an example mold, and FIG. 2B is a cross-sectional view of the example mold.

The glass manufacturing method may include a first step of forming a mold assembly by sequentially stacking a lower mold, a flat glass, and an upper mold is performed.

As illustrated in FIG. 2A, a mold may include an upper mold 210 and a lower mold 220. The lower mold 220, the flat glass and the upper mold 210 are primarily assembled together.

In some implementations, the movement of the upper and lower molds in the primarily assembled mold assembly 200 is limited in a predetermined direction. For example, in the mold assembly, the upper mold 210 may only move up and down with respect to the lower mold 220.

In some examples, each of the lower and upper molds may be provided with a guide for guiding the movement of the upper mold when the upper mold is aligned with the lower mold. For example, referring to FIG. 2A, a plurality of holes 222 may be formed in an edge of the lower mold, and a plurality of concave-convex structures 211 may be formed on an edge of the upper mold. When the concave-convex structures are inserted into the holes, the upper mold can only move up and down with respect to the lower mold. However, the present disclosure is not limited thereto. Alternatively, the lower mold may include the concave-convex structures and the upper mold may include the holes. Also, such element for guiding the movement of the upper mold is not limited to the holes and the concave-convex structures.

As described above, when glass molding is performed after the lower mold and the upper mold are primarily aligned with each other, the molds can move only in a specific direction, which may result in improving molding precision.

In some examples, when the lower and upper molds are aligned with each other, a flat glass is disposed between the lower and upper molds. At this time, the load (or weight) of the upper mold may be delivered to the glass. In this case, the glass may be likely to be broken. To prevent this, an elastic member may be interposed between the lower and upper molds.

The elastic member may be disposed on the edge of the lower mold. For example, when the holes are provided in the edge of the lower mold, the elastic member may be disposed inside the holes. When the upper mold is aligned with the lower mold, the elastic member pushes up the upper mold, thereby preventing the load of the upper mold from being transferred to the flat glass.

For example, referring to FIG. 2B, an elastic member 300 may be disposed in the holes formed in the lower mold. The elastic member 300 may push up the concave-convex structures 221 formed on the upper mold 210 to prevent the upper mold 210 from being brought into contact with the flat glass.

In some examples, the elastic member 300 may be disposed on an intermediate mold interposed between the lower mold and the upper mold. Specifically, the intermediate mold may be disposed between the lower mold and the upper mold. The intermediate mold may be provided with a structure for guiding the movement of the lower mold and the upper mold, and the elastic member disposed on the intermediate mold may push up the upper mold.

The elastic member may be formed of a material which does not reach a yield point even if it is compressed by the upper mold at a temperature of 900° C. or lower. In detail, the lower mold, the flat glass, and the upper mold are heated up to a temperature of 900° C. at a second step to be explained later, and then formed. Accordingly, the elastic member may be able to prevent the load of the upper mold from being transferred to the flat glass by pushing up the upper mold even at the temperature of 900° C. That is, the elastic member may not lose an elastic force even at the temperature of 900° C. In some examples, the elastic member may be an alloy consisting of Ni, Cr, Ti and Al alloy. For example, the elastic member may be "Nimonic 90."

The elastic member has an elastic force which is strong enough to push the upper mold upward, but is compressed when pressure is applied to the upper mold in a third step to be described later. Accordingly, the upper mold is brought into contact with the flat glass.

As the mold assembly passes through four different chambers, the flat glass is formed into a curved surface. Hereinafter, steps performed in each of the four chambers will be described.

In the present disclosure, a second step (S110) of heating the mold assembly after moving the mold assembly to a first chamber is performed.

In the first chamber 110, the flat glass 230 is heated up to a temperature of enabling glass molding. Here, the temperature of enabling the glass molding is in the range of 700 to 900° C. The temperature of enabling the glass molding may differ depending on a type of glass.

In the second step, each of the lower and upper molds may be heated by different hot plates. Specifically, a hot plate (hereinafter, referred to as a lower hot plate) may be fixed to a bottom surface of the first chamber, and a hot plate (hereinafter, referred to as an upper hot plate) that is disposed to be movable up and down may be disposed above the first chamber. The lower mold 220 is heated by the lower hot plate as the mold assembly 200 is seated on the bottom surface of the first chamber.

In some implementations, the upper hot plate comes into contact with the upper mold 210 by way of the up-and-down movement after the mold assembly is moved to the first chamber. As a result, the upper mold 210 is heated. In this case, the load of the upper hot plate may be prevented from being transferred to the upper mold 210.

In some examples, a hot plate (hereinafter, a side hot plate) different from the upper and lower hot plates may be disposed on a side surface of the first chamber 110. The side hot plate may be disposed in the first to third chambers. This will be described later.

When the flat glass is heated to a predetermined temperature, a third step (S120) of molding the flat glass after moving the mold assembly to the second chamber 120 is carried out.

Specifically, a step of molding the flat glass into a curved shape is performed in the second chamber. When the mold assembly heated to a predetermined temperature is moved to the second chamber, the upper hot plate disposed above the mold assembly 200 is placed on the upper mold 210 to pressurize the upper mold 210. That is, the upper hot plate disposed in the second chamber is used not only as an element for heating the upper mold 210 but also as an element for pressurizing the upper mold 210. However, the present disclosure is not limited thereto, and the upper hot plate may alternatively be pressurized by a separate pressurizing element so as to pressurize the upper mold 210 in the second chamber 120.

As the upper mold 210 is pressurized, a distance between the upper and lower molds 210 and 220 is narrowed, and accordingly the flat glass disposed between the upper and lower molds 210 and 220 is processed (machined).

While the glass is being molded, an internal temperature of the second chamber is maintained at a temperature in the range of 700 to 900° C. In some examples, the upper mold 210 is heated by the upper hot plate and the lower mold 220 is continuously heated by the lower hot plate disposed on the bottom surface of the second chamber.

In some examples, as the upper mold 210 is pressurized, the elastic member 300 disposed between the upper and lower molds 210 and 220 is compressed. The elastic member 300 is kept compressed while the glass is molded, and does not reach a plastic limit.

When the third step is completed, the upper hot plate disposed inside the second chamber 120 is moved to an upper side of the second chamber 120. Accordingly, since pressure applied to the upper mold 210 disappears, the upper mold 210 is pushed upward by the elastic member 300. Accordingly, the molded glass and the upper mold 210 may be spaced apart from each other. The mold assembly 200 may be moved to the third chamber while the molded glass and the upper mold are spaced apart from each other.

Thereafter, when the mold assembly 200 is moved from the third chamber 130 to the fourth chamber 140, the upper mold 210 may be spaced apart from the glass whenever it is discharged from the fourth chamber 140. However, when the glass is completely molded, the upper mold 210 does not need to be spaced apart from the glass anymore. To prevent an impact from being applied to the glass due to the upper mold 210 being repeatedly brought into contact with and spaced apart from the glass, the upper mold 210 may be fixed to the lower mold 220 after the third step.

In some examples, the lower mold 220 may be provided with a fixing element for fixing the upper mold 210, and the upper mold 210 may be fixed to the lower mold 220 after being pressurized in the third step. Accordingly, in fourth and fifth steps to be described later, the upper mold 210 may not be spaced apart from the glass.

When the glass molding is completed, a fourth step (S130) of moving the mold assembly to the third chamber to slowly cool the mold assembly is carried out.

When the glass heated up to 700 to 900° C. is directly exposed to room temperature (e.g., about 20 to 25° C.), cracking may occur. Thus, the step of slowing cooling the glass is performed. The mold assembly 200 is cooled down to a temperature of 400° C. or lower in the third chamber 130, and then moved to the fourth chamber 140. Accordingly, an internal temperature of the third chamber 130 may be in the range of 400 to 700° C.

After the mold assembly 200 is completely moved to the third chamber 130 from the second chamber 120, the upper plate disposed in the third chamber 130 is brought into contact with the upper mode so as to slowly lower the temperature of the upper mold and the lower hot plate disposed in the third chamber slowly lowers the temperature of the lower mold.

When the fixing element for fixing the upper mold 210 to the lower mold 220 is not provided, the upper mold 210 is moved from the second chamber 120 to the third chamber 130 in a state of being spaced apart from the molded glass. When the upper plate disposed in the third chamber 130 is placed on the upper mold 210, the upper mold 210 is brought into contact with the glass due to the load of the upper hot plate. The molded glass is slowly cooled in contact with the upper and lower molds 210 and 220.

Finally, a fifth step (S140) of cooling the molded glass after the mold assembly 200 is moved from the third chamber 130 to the fourth chamber 140 is performed.

The molded glass is cooled down to room temperature in the fourth chamber 140. When the glass is cooled down to the room temperature, the mold assembly 200 may be discharged to the outside, and the upper and lower molds 210 and 220 and the elastic member 300 may be recovered and reused.

In some implementations, the upper and lower molds 210 and 220 may be oxidized by oxygen in the air at a temperature of 400° C. or higher. When the mold is oxidized, changes may occur, for example, the surface of the mold becomes rough, and the like, and thereby molding precision may be lowered. In order to prevent the mold from being oxidized during glass molding, the first to third chambers may be created in a nitrogen atmosphere.

In some examples, since the internal temperature of the fourth chamber 140 is 400° C. or lower, the inside of the fourth chamber 140 does not need to be formed in the nitrogen atmosphere. By not filling the inside of the fourth chamber 140 with nitrogen, a nitrogen supply cost can be reduced.

In some implementations, in order to prevent oxygen from flowing into the first to third chambers, the first to third chambers may be hermetically sealed. When the mold assembly 200 is moved from the outside to the first chamber 110, it is difficult to maintain a sealed state when the mold assembly 200 is moved from the third chamber 130 to the fourth chamber 140. The present disclosure provides a manufacturing method for minimizing a nitrogen loss that occurs when moving the mold assembly.

Hereinafter, a manufacturing method for minimizing a nitrogen loss will be described.

In order to minimize an amount of nitrogen lost when moving the mold assembly 200 from the outside to the first chamber 110, the present disclosure can move the mold assembly 200 from the outside to the first chamber 110 through a loading part. In some implementations, in order to minimize an amount of nitrogen lost when the mold assembly 200 is moved from the third chamber 130 to the fourth chamber 140, the present disclosure can move the mold assembly 200 from the third chamber 130 to the fourth chamber 140 through an unloading part.

Hereinafter, the loading part and the unloading part will be described in detail.

Figure 3A:
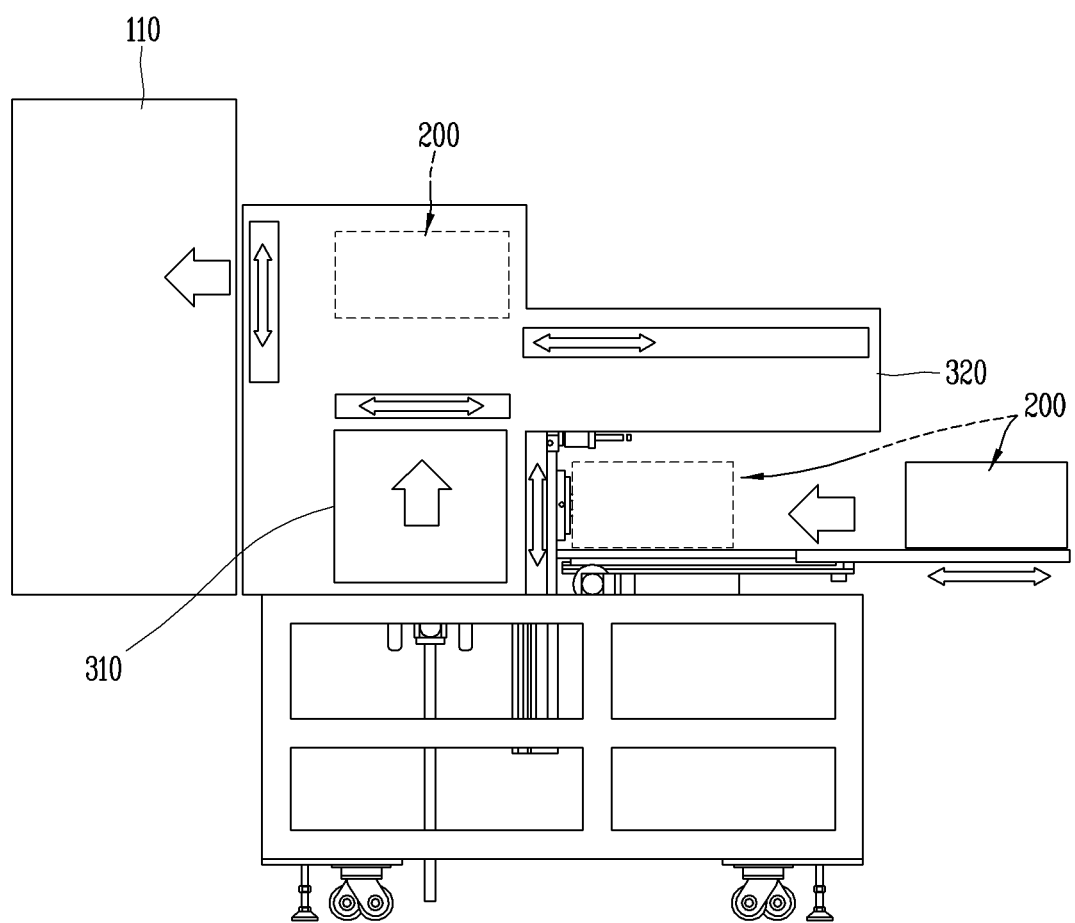
FIG. 3A is a conceptual view illustrating a cross-section of an example of a loading part.
Figure 3B:
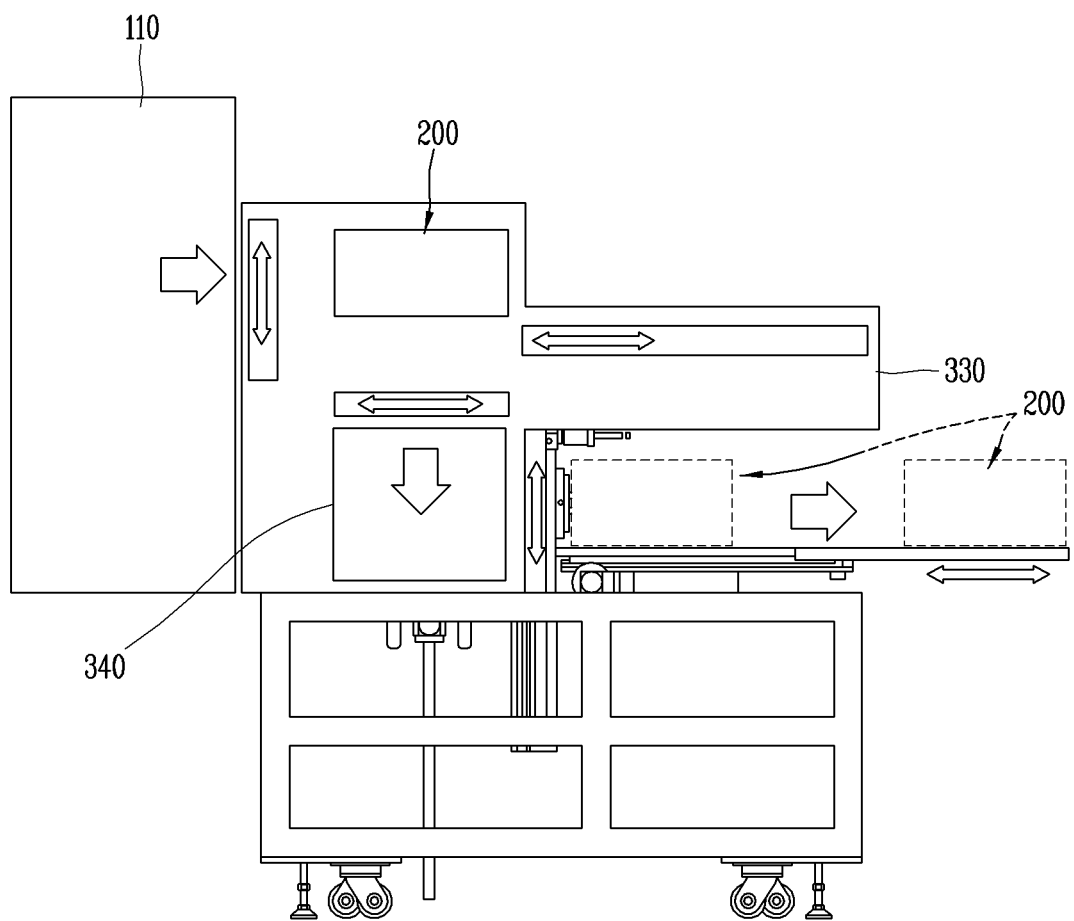
FIG. 3B is a conceptual view illustrating a cross-section of the unloading part of FIG. 3A.

FIG. 3A is a conceptual view illustrating a cross-section of a loading part, and FIG. 3B is a conceptual view illustrating a cross-section of an unloading part.

Referring to FIG. 3A, the loading part includes a first sub chamber 310 and a second sub chamber 320. The mold assembly 200 is moved from outside to the first sub chamber 310, and then moved from the first sub chamber 310 to the second sub chamber 320. Thereafter, the mold assembly 200 is moved from the second sub chamber 320 to the first chamber 110.

Whenever the mold assembly 200 is moved to each chamber, a gate located between the chambers is opened. At this time, gases in the two chambers are mixed with each other. When the mold assembly 200 is moved directly from the outside to the first chamber 110, a sealed state of the first to third chambers which are sealed together may be broken. Accordingly, oxygen may be introduced into each of the first to third chambers.

To prevent this, after moving the mold assembly 200 to the sub chamber, the sub chamber is formed in a nitrogen atmosphere and then the mold assembly 200 is moved to the first chamber 110. That is, the sub chamber may be formed in the nitrogen atmosphere every time when the mold assembly 200 is moved to the first chamber 110.

When the volume of the sub chamber is reduced, a time for which the sub chamber is formed in the nitrogen atmosphere and an amount of nitrogen to be used may be reduced. However, it is difficult to reduce the volume of the sub chamber itself due to the volume of a transferring element for transferring (conveying, moving) the mold assembly 200. Specifically, a nitrogen atmosphere may also be formed in a position where the transferring element for moving the mold assembly 200 is arranged. Thus, the transferring element must be arranged inside the sub chamber. Since the volume of the sub chamber has no option but to be increased because the transferring element has to be employed.

The present disclosure describes an implementation including two sub chambers, in order to shorten a time for which sub chambers are formed in a nitrogen atmosphere and to minimize an amount of nitrogen to be used at this time. Specifically, the first sub chamber 310 has a volume similar to that of the mold assembly 200. The first sub chamber 310 is provided with the least number of transferring elements to minimize the volume. For example, the first sub chamber 310 may include only a vertical (or perpendicular) transferring element.

As the mold assembly is moved into the first sub chamber 310, the inside of the first sub chamber 310 is filled with air. Afterwards, the mold assembly 200 is moved to the second sub chamber 320 formed in the nitrogen atmosphere. Thus, before the movement, a step of forming the first sub chamber 310 in the nitrogen atmosphere is performed. Since the first sub chamber 310 has a very small volume, the nitrogen atmosphere can be quickly formed and a very small amount of nitrogen is used.

Thereafter, the mold assembly is moved from the first sub chamber 310 to the second sub chamber 320. The second sub chamber 320 has a larger volume than the first sub chamber 310 because the second sub chamber 320 has horizontal and vertical transferring elements for transferring the mold assembly 200 to the first chamber 110. The inside of the second sub chamber 320 may always be in the nitrogen atmosphere. Since the mold assembly 200 is moved after the first sub chamber 310 is formed in the nitrogen atmosphere, even if the mold assembly 200 is moved to the second sub chamber 320, the nitrogen gas inside the second sub chamber 320 is not lost. Thereafter, the mold assembly 200 is moved from the second sub chamber 320 in the nitrogen atmosphere to the first chamber 110 in the nitrogen atmosphere.

In some implementations, an internal pressure of the first sub chamber 310 may be formed to be higher than atmospheric pressure by 1500 to 1800 Pa, and an internal pressure of the second sub chamber 320 may be formed to be higher than the atmospheric pressure by 1200 to 1500 Pa. That is, the internal pressure pf the first sub chamber 310 may be higher than the internal pressure of the second sub chamber 320. This is to replenish nitrogen lost in the second sub chamber 320 whenever the mold assembly is moved from the first sub chamber 310 to the second sub chamber 320.

In some examples, referring to FIG. 3B, the unloading part is formed symmetrically with the loading part. The unloading part includes a third sub chamber 330 and a fourth sub chamber 340. Here, description of the third sub chamber 330 is replaced with the description of the second sub chamber 320, and description of the fourth sub chamber 340 is replaced with the description of the first sub chamber 310.

The mold assembly 200 is moved from the third chamber 130 to the third sub chamber 330 in a nitrogen atmosphere. Thereafter, the mold assembly 200 is moved from the third sub chamber 330 to the fourth sub chamber 340 and then moved to the fourth chamber 140 in an air atmosphere.

Before moving the mold assembly 200 from the third sub chamber 330 to the fourth sub chamber 340, a step of forming the fourth sub chamber 340 in a nitrogen atmosphere is performed. This is to prevent oxygen, which has been introduced when moving the mold assembly 200 from the fourth sub chamber 340 to the fourth chamber 140, from being introduced into the third sub chamber 330. Since the fourth sub chamber 340 is smaller than the third sub chamber 330 in volume, the present disclosure can reduce a time for forming the sub chamber in the nitrogen atmosphere to discharge the mold assembly 200 and an amount of nitrogen to be used.

As described above, by using two sub chambers having different volumes, a processing time of press molding may be shortened, and the amount of nitrogen used during the processing may be reduced.

In some examples, the present disclosure minimizes an impact applied to the mold during press molding. In some examples, the present disclosure utilizes a transferring element for minimizing the impact applied to the mold when moving the mold.

Hereinafter, a method of moving a mold assembly between chambers will be described.

Figure 4:
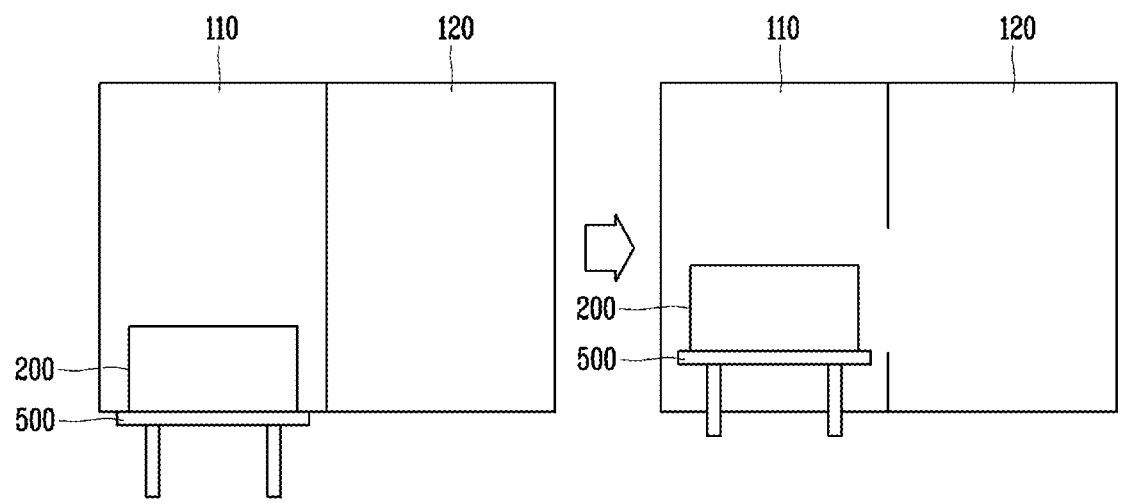
FIG. 4 is a conceptual view illustrating an example of a method of moving a mold assembly between chambers.
Figure 4:
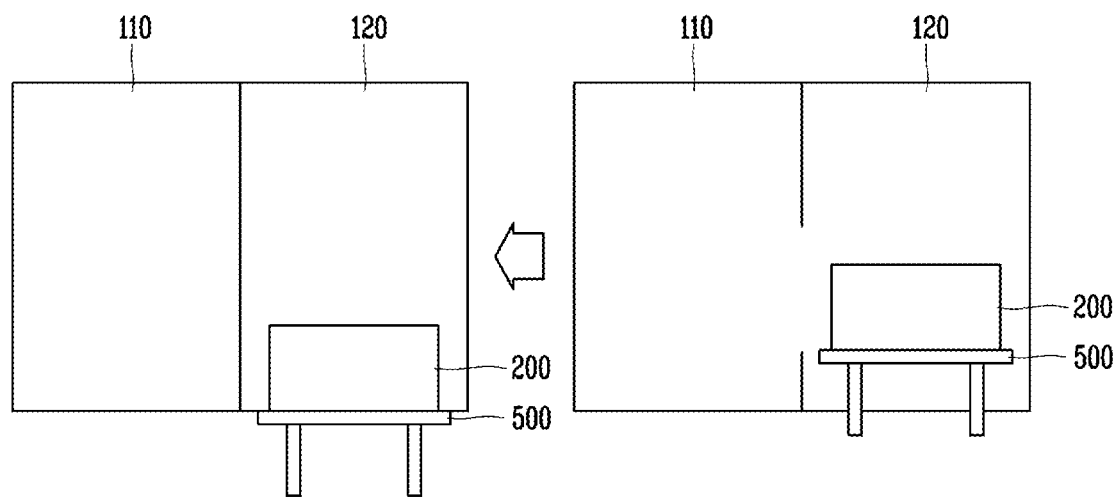
Figure 5A:
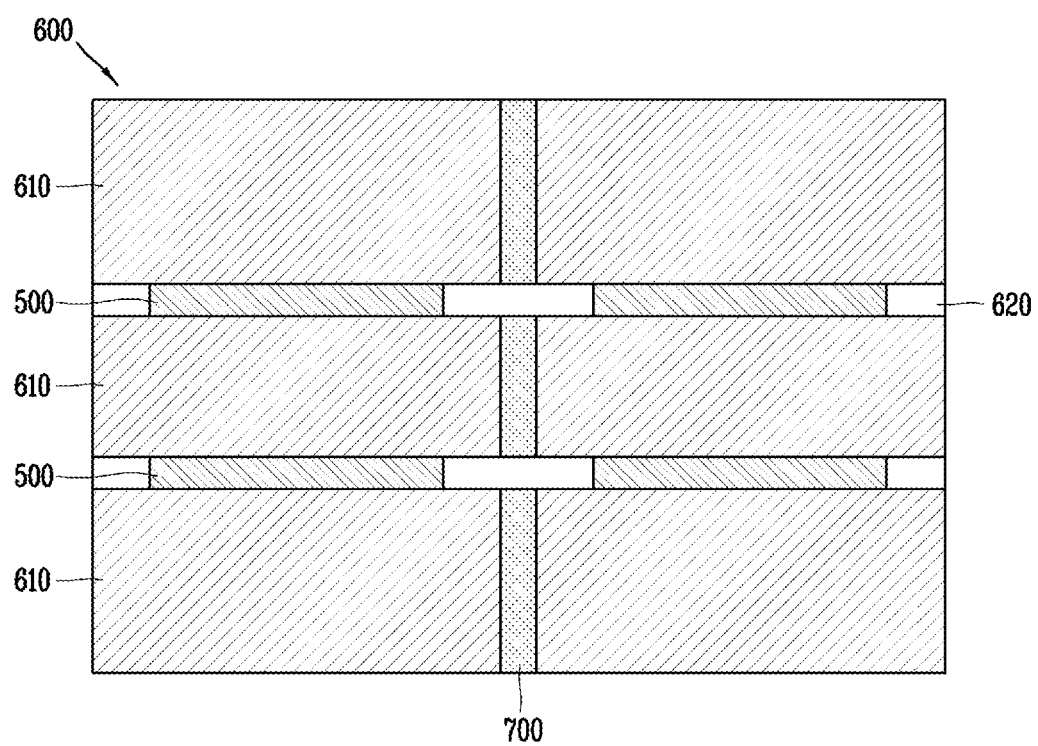
FIG. 5A is a conceptual view illustrating an example of a bottom surface of a chamber.
Figure 5B:
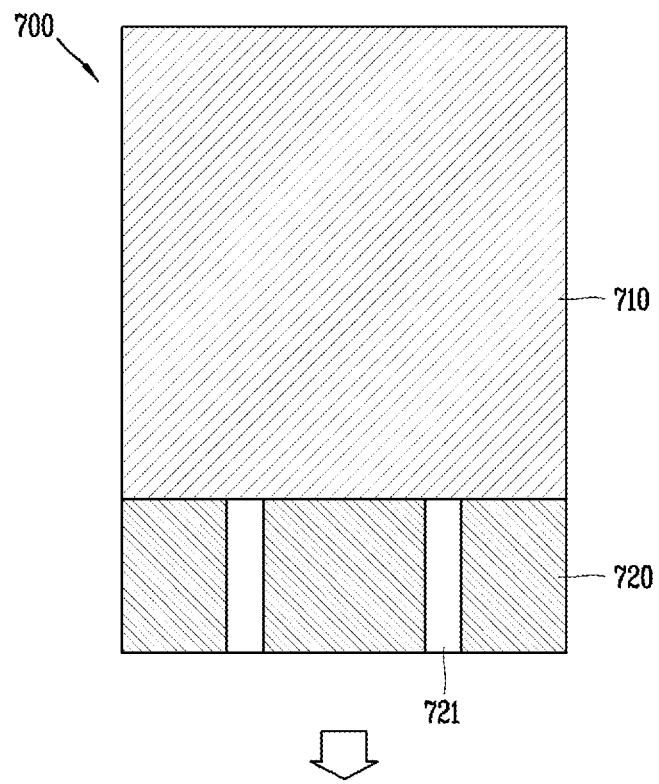
FIG. 5B is a conceptual view illustrating an example of a partition wall disposed between chambers.
Figure 5B:
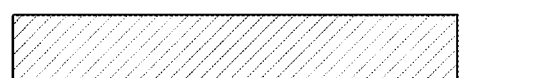
Figure 5B:
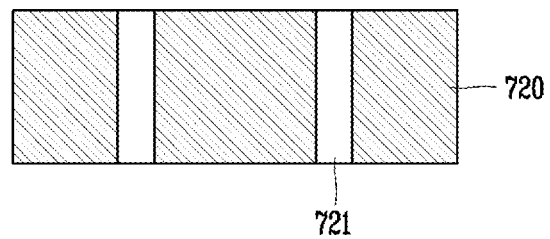
Figure 5C:
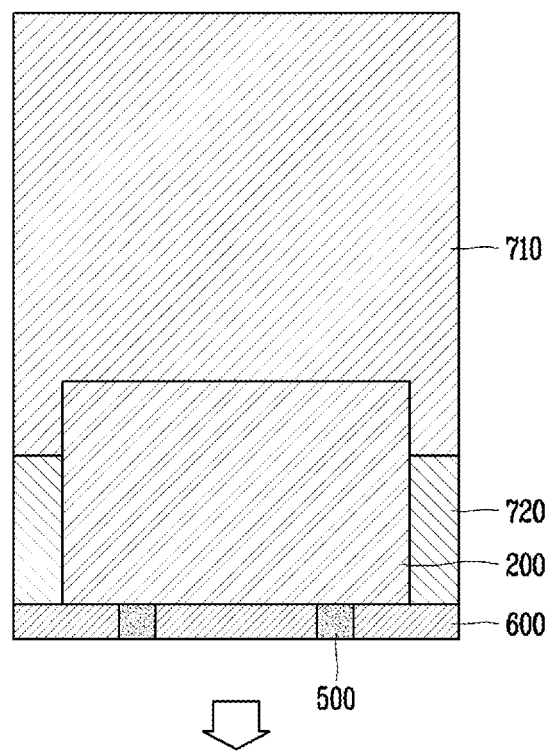
FIG. 5C is a conceptual view illustrating an example operation of moving a mold assembly to another chamber through a partition wall.
Figure 5C:
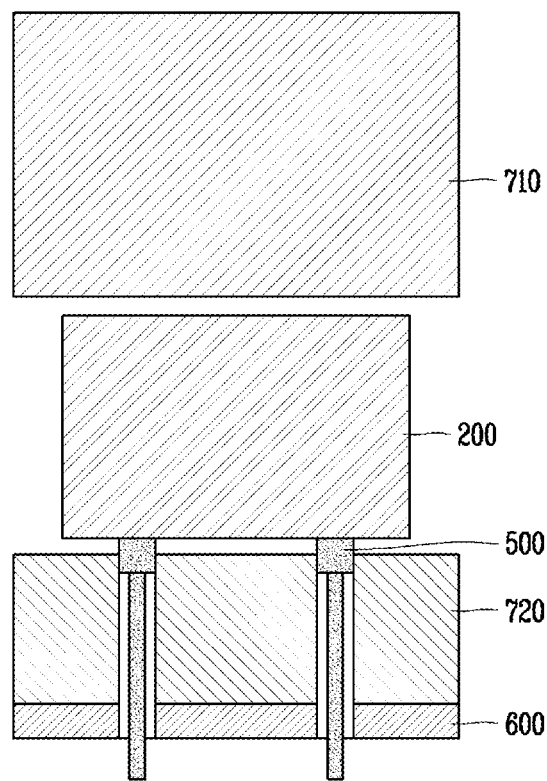

FIG. 4 is a conceptual view illustrating an example method of moving a mold assembly between chambers, FIG. 5A is a conceptual view illustrating an example of a bottom surface of a chamber, FIG. 5B is a conceptual view illustrating an example of a partition wall formed between chambers, and FIG. 5C is a conceptual view illustrating an example operation of moving a mold assembly to another chamber through a partition wall.

Referring to FIG. 4, a step of moving the mold assembly 200 from one of the first to fourth chambers to another chamber may include moving a transferring bar 500 disposed below the one chamber into the one chamber to lift the mold assembly 200 from the bottom of the mold assembly 200, horizontally moving the transferring bar 500 to the other chamber in a state where the transferring bar 500 is lifting the mold assembly 200, and putting the mold assembly 200 down on a bottom surface of the other chamber while moving the transferring bar 500 to the bottom of the other chamber.

Here, the transferring bar 500 which is disposed below a chamber is moved to an upper side of the chamber, so as to lift the mold assembly 200. As illustrated in FIG. 5A, a passage 620 may be formed through a bottom surface 600 of a chamber to allow the transferring bar 500 to pass therethrough. The passage 620 is formed to be large enough for the transferring bar 500 to pass therethrough, so as to minimize the loss of heat in the chamber to outside.

The transferring bar 500 may be implemented by two bars to stably lift the mold assembly 200. The bottom surface 600 may include a plurality of bottom portions 610. The passage 620 may be formed through and between the plurality of bottom portions 610 of the bottom surface 600 of the chamber as many as the number of bars implementing the transferring bar 500.

The transferring bar 500 lifts the mold assembly 200 through the passages 620 and then horizontally moves along the passages 620. In this example, force may not be directly applied to the mold assembly 200 itself when horizontally moving the mold assembly 200, thereby minimizing an impact applied to the mold assembly 200 during movement between chambers.

In some implementations, the transferring bar 500 passes through a partition wall 700 disposed between two chambers while lifting the mold assembly 200. Here, the partition wall 700 may be disposed between the two chambers to maintain insulation between the two chambers, and to make internal temperature of the chambers uniform.

As illustrated in FIG. 5B, the partition wall 700 may include an upper partition wall 710 and a lower partition wall 720. Here, the upper partition wall 710 serves to open and close the partition wall through vertical movement, and the lower partition wall 720 may be disposed in a fixed state. A partition hole 721 may be formed through the lower partition wall 720 to allow the transferring bar 500 to move horizontally. The transferring bar 500 may move between chambers through the partition hole 721 formed through the lower partition wall 720.

In detail, as illustrated in FIG. 5C, when the transferring bar 500 lifts the mold assembly 200, the partition wall is opened as the upper partition wall 710 moves to an upper side of a chamber. Here, the transferring bar 500 lifts the mold assembly 200 up to a height of the lower partition wall 720 so that the mold assembly 200 can move to another chamber over the lower partition wall 720.

As described above, the present disclosure minimizes a force applied to the mold assembly when moving the mold assembly from one chamber to another chamber, thereby minimizing deformation of the mold assembly during movement and preventing an impact applied to the mold assembly from being transferred to the glass.

In some implementations, the present disclosure allows heat to be uniformly transferred all over the mold assembly when the mold assembly is heated. Hereinafter, a manufacturing method for uniformly transferring heat all over a mold assembly in a chamber will be described.

Figure 6:
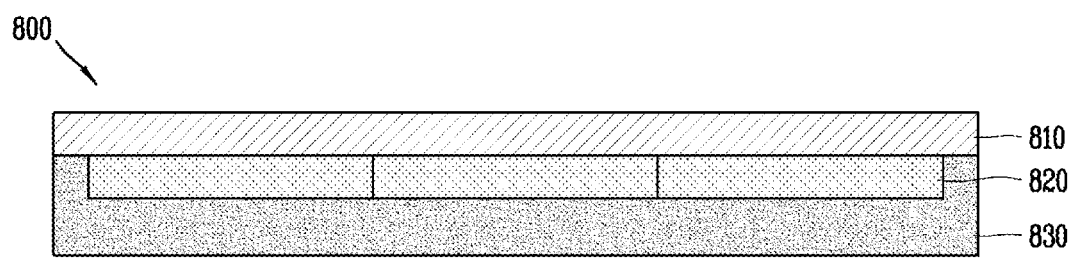
FIG. 6 is a conceptual view illustrating a cross-section of an example of a hot plate.

FIG. 6 is a conceptual view illustrating a cross-section of a hot plate.

Referring to FIG. 6, the upper hot plate and the lower hot plate (hereinafter, the first hot plate 800) may include an insulating material 810, a heating portion 820 in which temperature increases as a current flows, and a heat transfer layer 830 covering the heating portion 820.

Heat generated in the heating portion 820 may vary depending on an area. For example, this may be because the current flow in the heating portion 820 is not uniform in all areas. When the mold is in direct contact with the heating portion 820, heat may be unevenly transferred to the mold for the aforementioned reason. The heat transfer layer 830 evenly spreads the heat generated in the heating portion 820 so that heat can be uniformly transferred to the entire mold.

In some implementations, since great pressure may be applied to the first hot plate 800 during the glass molding process, when the mold comes in contact with the heating portion 820, the heating portion 820 may be deformed. The heat transfer layer 830 serves to prevent the heating portion 820 from being deformed due to external pressure.

In addition, the heating portion 820 made of a metal material may be oxidized when exposed to high temperature. The heat transfer layer 830 serves to prevent the oxidation of the heating portion 820.

For example, the heat transfer layer 830 may be made of any one of graphite, anti-oxidation coated graphite, and a ceramic material.

In some implementations, a ratio of the thickness of the heat transfer layer 830 with respect to the width of the first hot plate 800 may be in the range of 0.01 to 0.1. In some cases, where the ratio of the thickness of the heat transfer layer 830 with respect to the width of the first hot plate 800 is smaller than 0.01, the heat transfer layer 830 may be destroyed due to pressure applied during the glass molding. In some cases, where the ratio of the thickness exceeds 0.1, a gap between the heating portion 820 and the mold may increase so as to lower thermal efficiency.

By utilizing the first hot plate, the deformation of the hot plate during glass molding can be prevented, and uniform heat transfer all over the mold can be achieved.

In some implementations, as described above, a second hot plate different from the first hot plate may be disposed on side surfaces of the first to third chambers.

For example, the second hot plate may not actually come in contact with the mold during the glass molding, and the second hot plate may not be exposed to high pressure and uniform heat transfer all over the surface of the mold is not required. Therefore, unlike the first hot plate, in the second hot plate, the heating portion does not have to be covered with the heat transfer layer.

The second hot plate is utilized to heat the side surface of the mold assembly to solve thermal imbalance that may occur when heating the mold assembly with the upper and lower hot plates. Since the second hot plate does not come in contact with the mold, the second hot plate may be heated to a higher temperature than the first hot plate. That is, the temperature of the second hot plates disposed in each of the first to third chambers is higher than the temperature of the first hot plates disposed in each of the first to third chambers.

By using the second hot plate, the mold can be uniformly heated during the glass molding.

It will be apparent to those skilled in the art that the present disclosure may be embodied in other specific forms without departing from the spirit or essential characteristics thereof.

Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A method for manufacturing curved glass, the method comprising:
preparing a mold assembly by stacking a lower mold, a glass part that has a flat shape, and an upper mold, the mold assembly comprising an elastic member that is disposed between the lower mold and the upper mold and that defines a space between the upper mold and the glass part;
placing the mold assembly in a first chamber, and heating the mold assembly in the first chamber;
moving the mold assembly from the first chamber to a second chamber, and pressurizing the upper mold and the elastic member downward to the lower mold in the second chamber to mold the glass part into a curved shape;
moving the mold assembly from the second chamber to a third chamber, and cooling the glass part in the third chamber; and
moving the mold assembly from the third chamber to a fourth chamber, and cooling the glass part in the fourth chamber,
wherein each of the first chamber, the second chamber, and the third chamber comprises a first hot plate comprising:
a heating portion configured to contact each of an upper side of the upper mold and a lower side of the lower mold and to change a temperature of the mold assembly based on electric current, and
a heat transfer layer that covers the heating portion, and
wherein heating the mold assembly in the first chamber comprises bringing the first hot plate located in the first chamber into contact with each of the upper side of the upper mold and the lower side of the lower mold.

2. The method of claim 1, wherein:
heating the mold assembly in the first chamber is performed based on the first chamber having an internal temperature in a range from room temperature to 900° C.,
pressurizing the upper mold to the lower mold in the second chamber is performed based on the second chamber having an internal temperature in a range from 700 to 900° C.,
cooling the glass part in the third chamber is performed based on the third chamber having an internal temperature in a range from 700 to 400° C., and
cooling the glass part in the fourth chamber is performed based on the fourth chamber having an internal temperature in a range from room temperature to 400° C.

3. The method of claim 2, wherein the internal temperature of the second chamber is less than 900° C. in a state in which the elastic member is compressed by the upper mold such that the elastic member applies an elastic force to the upper mold.

4. The method of claim 3, wherein the elastic member is an alloy including Ni, Cr, Ti, and Al.

5. The method of claim 2, wherein:
placing the mold assembly in the first chamber is performed based on the first chamber having a nitrogen atmosphere,
moving the mold assembly from the first chamber to the second chamber is performed based on the second chamber having a nitrogen atmosphere, and
moving the mold assembly from the second chamber to the third chamber is performed based on the third chamber having a nitrogen atmosphere.

6. The method of claim 5, wherein placing the mold assembly in the first chamber comprises:
placing the mold assembly in a first sub chamber and then supplying nitrogen to an inside of the first sub chamber to define a nitrogen atmosphere;
moving the mold assembly from the first sub chamber to a second sub chamber that has a nitrogen atmosphere; and
moving the mold assembly from the second sub chamber to the first chamber, and
wherein a volume of the first sub chamber is less than a volume of the second sub chamber.

7. The method of claim 6, wherein a nitrogen pressure inside the first sub chamber is greater than a nitrogen pressure in the second sub chamber.

8. The method of claim 5, wherein moving the mold assembly from the third chamber to the fourth chamber and cooling the glass part in the fourth chamber comprise:
moving the mold assembly from the third chamber to a third sub chamber that has a nitrogen atmosphere;
moving the mold assembly from the third sub chamber to a fourth sub chamber that has a nitrogen atmosphere; and
moving the mold assembly from the fourth sub chamber to the fourth chamber that has an air atmosphere, and
wherein a volume of the fourth sub chamber is less than a volume of the third sub chamber.

9. The method of claim 1, wherein pressurizing the upper mold and the elastic member downward comprises fixing the upper mold to the lower mold, and
wherein moving the mold assembly from the second chamber to the third chamber and cooling the glass part in the third chamber are performed in a state in which the upper mold is fixed to the lower mold.

10. The method of claim 1, wherein each step of moving the mold assembly from any one chamber among the first to fourth chambers to another chamber among the first to fourth chambers comprises:
moving a transferring bar disposed vertically below the one chamber into the one chamber, and lifting the mold assembly from below the mold assembly by the transferring bar;
horizontally moving the mold assembly from the one chamber to the another chamber based on the transferring bar lifting the mold assembly; and
putting the mold assembly down on a bottom surface of the another chamber based on moving the transferring bar to a lower side of the another chamber.

11. The method of claim 10, wherein:
each of the first chamber, the second chamber, the third chamber, and the fourth chamber defines a passage that passes through a bottom surface thereof and that allows movement of the transferring bar, and horizontally moving the mold assembly comprises moving the transferring bar horizontally along the passage.

12. The method of claim 11, wherein:

adjacent chambers among the first chamber, the second chamber, the third chamber, and the fourth chamber are divided by a partition wall interposed therebetween and configured to be opened and closed, and horizontally moving the mold assembly comprises opening the partition wall based on moving the transferring bar horizontally along the passage.

13. The method of claim 12, wherein the partition wall defines a partition hole that allows the transferring bar to horizontally move between the adjacent chambers.

14. The method of claim 1, wherein a ratio of a thickness of the heat transfer layer with respect to a width of the first hot plate is in a range from 0.01 to 0.1.

15. The method of claim 1, wherein the heat transfer layer is made of graphite, anti-oxidation coated graphite, or a ceramic material.

16. The method of claim 1, wherein each of the first chamber, the second chamber, and the third chamber comprises:

a second hot plate that is disposed on a side surface thereof and that has a temperature higher than a temperature of the first hot plate.

17. The method of claim 16, wherein heating the mold assembly in the first chamber further comprises:

bringing the first hot plate into contact with the mold assembly while maintaining a space between the second hot plate and the mold assembly.

18. The method of claim 1, wherein pressurizing the upper mold in the second chamber comprises:

heating and applying the pressure to the mold assembly based on bringing the first hot plate located in the second chamber into contact with each of the upper side of the upper mold and the lower side of the lower mold.

19. The method of claim 1, further comprising:

vertically moving the mold assembly within at least one of the first chamber, the second chamber, or the third chamber.

* * * * *